United States Patent [19]

Wichner et al.

[11] Patent Number: 5,491,549
[45] Date of Patent: Feb. 13, 1996

[54] APPARATUS FOR ACQUIRING PENDULUM OSCILLATIONS OF CRANE LOADS USING MEASUREMENT TECHNIQUES

[75] Inventors: Wolfgang Wichner, Wendelstein; Ludwig Carbon, Erlangen, both of Germany

[73] Assignee: Siemens Aktiengesellschaft, Munich, Germany

[21] Appl. No.: 147,244

[22] Filed: Nov. 3, 1993

[30] Foreign Application Priority Data

Nov. 3, 1992 [DE] Germany ............... 42 37 096.5
Jun. 3, 1993 [EP] European Pat. Off. ........ 93108948

[51] Int. Cl.$^6$ .................... G01B 11/26; B66C 13/06
[52] U.S. Cl. ............. 356/141.2; 212/276; 212/275; 348/95
[58] Field of Search .............. 348/95; 212/153, 212/146; 356/141.2, 141.1

[56] References Cited

U.S. PATENT DOCUMENTS

| | | | |
|---|---|---|---|
| 3,826,380 | 7/1974 | Lenander et al. | 212/125 |
| 4,281,342 | 7/1981 | Ueda et al. | 356/373 |
| 4,385,028 | 5/1983 | Salaman | 376/264 |
| 4,883,184 | 11/1989 | Albus | 212/146 |
| 4,932,541 | 6/1990 | Belsterling | 212/191 |
| 5,089,972 | 2/1992 | Nachman et al. | 364/478 |

FOREIGN PATENT DOCUMENTS

| | | |
|---|---|---|
| 0342655 | 11/1989 | European Pat. Off. . |
| 0467783 | 1/1992 | European Pat. Off. . |
| 2669317 | 5/1992 | France . |
| 9205427 | 8/1992 | France . |
| 2099255 | 12/1982 | United Kingdom . |
| WO90/09336 | 8/1990 | WIPO . |
| WO91/14644 | 10/1991 | WIPO . |
| WO92/19526 | 11/1992 | WIPO . |

OTHER PUBLICATIONS

Fördern und Heben, vol. 42, No. 11, 1992, Mainz, pp. 890–892: Laser–Sensoren für die Kranautomatisierung.

Primary Examiner—Stephen C. Buczinski
Attorney, Agent, or Firm—Kenyon & Kenyon

[57] ABSTRACT

To be able to acquire pendulum oscillations in the case of cranes with a high degree of accuracy, a marking having a reflecting surface is disposed in the area of the load. Mounted on the crane are both lighting equipment directed at the marking as well as a line-scanning camera that is likewise directed at the marking and that has an image-sensor linear array. The image-sensor linear array is aligned longitudinally to the direction of swing (x). Its signal is evaluated in an evaluation device to determine the instantaneous position of the marking.

21 Claims, 5 Drawing Sheets

APPARATUS FOR ACQUIRING PENDULUM OSCILLATIONS OF CRANE LOADS USING MEASUREMENT TECHNIQUES

BACKGROUND OF THE INVENTION

The present invention relates generally to measurement apparatuses and more particularly to an apparatus for acquiring pendulum oscillations crane loads using measurement techniques.

Cranes, such as container cranes, pick up loads at a predetermined location, transport them over a known distance, and set them down at an established location. In automating these operations, the problem occurs that the load is propelled into unwanted pendulum motions due to the necessary start-up and braking actions. These pendulum motions die out slowly due to the negligible inherent damping of the system. As a result, they considerably hinder and delay the process of accurately picking up and lowering loads. Since the conveying capacity is determined to a large extent by how fast the load can be picked up and placed down, to provide the capability of a large conveying capacity, one must attempt to control these motions using automatic control engineering measures, to reduce them to a tolerable level or even to utilize them. When the pendulum motion of the load cannot be easily calculated in advance, such as by computer simulation, one must be able to detect the actual pendulum motion. Thus, the actual position of the load changing as a function of time must be determined to compensate for the pendulum oscillations of the load as well as to automatically control the positioning of the load.

However, this problem has only been partially solved in known methods heretofore. Thus, according to existing mechanical methods, the swinging cables, on which the load is suspended, move metal bars that are arranged below the cable guide block, or rather cable drum. Such a mechanism allows the instantaneous swing angle or rather its rate of change to be acquired to compensate for the pendulum oscillation of the load with sufficient accuracy. However, the accuracy achieved by these mechanisms does not suffice for automatic load-positioning control systems. Moreover, the known system is mechanically sensitive and entails high maintenance costs.

It has been proposed to acquire the mentioned quantities with the aid of laser technology, by mounting laser-based scanning and ranging devices on the crane to scan the outer edges of the load within a specified angular scanning range. However, the current state of the art does not yet make it possible to simultaneously achieve very high measuring accuracies and short measuring times over a larger angular scanning range. To obtain a high measuring accuracy within still tolerable measuring times, the angular scanning range must be limited to a few degrees. The inherent danger is, however, that the load will disappear from the field of view of the laser-based scanning and ranging devices, given larger pendulum motions.

The present invention is directed to the problem of developing an apparatus for acquiring pendulum oscillations of loads borne by cranes with a high degree of accuracy and reliability.

SUMMARY OF THE INVENTION

The present invention solves this problem by disposing a marking with a reflective surface in the area of the load, by mounting lighting equipment on the crane, which lighting equipment is directed at the marking on the crane, and by mounting a line-scanning camera on the crane, which camera is directed at the marking, and which camera has an image-sensor linear array aligned longitudinally to the direction of swing. In addition, the present invention provides an evaluation unit, which determines positional data pertaining to the load from the signal of the image-sensor linear area, downstream from the line-scanning camera. The marking can be placed directly on the load or preferably on a load-suspension frame (i.e., a spreader). In the simplest case, the lighting equipment can consist of a spotlight. The marking is continually situated in the field of view of the line-scanning camera when there are pendulum motions in the extended direction of the image-sensor linear array. The reflecting surface is very bright in the view of the camera due to the illumination. This renders possible short light-exposure times and, thus, short measuring times. Contributing significantly to the latter is also the fact that the image is not acquired and processed over a surface area, but rather only along one line. This is namely the line in which the load experiences the pendulum motion. The circumstance taken into consideration here is that the pendulum motion caused by the conveyance of the load essentially follows in only one direction, especially in the case of cranes having trolley-carriage drives, but also in the case of cranes where the load is suspended in a comparable fashion on two or more cables.

To ensure that the marking does not disappear from the field of view of the camera in the case of unwanted pendulum motions at right angles to the pendulum motion to be acquired, it is advantageously provided for the reflecting surface to extend by a predetermined minimum amount at right angles to the orientation of the image-sensor linear array.

When pendulum motions occur in different directions, for example in the case of slewing cranes, and also need to be acquired, it can be provided within the scope of the present invention for the extent of the reflecting surface to vary at right angles to the orientation of the image-sensor linear array. In this case, the component of the pendulum motion in the direction of the image-sensor linear array is determined from the position of the image formation of the reflecting surface on the image-sensor linear array, and the motion component running at right angles to this by the extent of the reflected surface, whose image is formed on the image-sensor linear array. Thus, although the pendulum oscillation of the load is acquired for two dimensions, only one single one-dimensional image-sensor linear array is required.

In accordance with one alternative refinement of the apparatus according to the present invention, an additional image-sensor linear array having an additional, downstream evaluation unit is provided at right angles to the orientation of the image-sensor linear array. This additional image-sensor linear array can be a component of a second or of the same line-scanning camera, which is directed toward the marking or toward an additional marking. The positional data supplied by the two evaluation units describe the specific component of the pendulum motion in the respective directions of the two sensor linear arrays that are aligned at right angles to one another. The advantage here is that the two motion components are each acquired using the same measuring methods and, thus, with the same measuring accuracy.

Possible rotary motions of the load are able to be advantageously acquired according to the present invention by providing an additional image-sensor linear array having an additional evaluation unit parallel to the image-sensor linear array, by providing that the marking is extended so far at right angles to the image-sensor linear array or by providing that an additional marking that is set apart from the marking at right angles to the image-sensor linear array, so as to allow it to be optically detected by the additional image-sensor linear array. The rotary motion of the load around the pendulum axis is detected thereby from the difference in the positional data supplied by the two evaluation units.

To attain the brightest possible marking in the view of the line-scanning camera and, consequently, the shortest possible measuring times, the lighting equipment and the line-scanning camera are preferably arranged directly side by side. In this case, the reflecting surface of the marking consists of triple-reflector elements. As a result, the light from the light equipment falling on the reflecting surface is reflected in the direction of the incident light into the line-scanning camera and, consequently, independently of the current angle of incidence of the light on to the reflecting surface that is dependent upon the lifting height and the pendulum motion. To simplify the evaluation of the pendulum motion of the load, the lighting equipment and the line-scanning camera are preferably arranged in the immediate vicinity of the pendulum suspension mount, and the marking vertically below the load in its position at rest.

Instead of acquiring the pendulum path that is dependent upon the lifting height, thus the pendulum length, a further development of the apparatus according to the present invention makes it possible to acquire the swing angle that is dependent on this by providing a measuring device to determine the prevailing pendulum length. In this case, the measuring signal from the measuring device is evaluated in the evaluation unit, together with the signal from the image-sensor linear array, to define the swing angle and/or the instantaneous load position. The measuring device can be a shaft-angle encoder or an absolute-value device that is mounted, for example, on the cable drum of the crane. Laser range finding can also be used to determine the pendulum length. In contrast to the laser-based angular measuring method mentioned at the outset, laser range finding makes it possible to achieve short measuring times.

One advantageous further development of the apparatus according to the present invention provides for the reflecting surface to border in the direction of swing on a non-reflecting, preferably dull-black surface and, to determine the position of the marking, for the evaluation unit to search for the signal from the image-sensor linear array after there has been a change in brightness with the greatest contrast at the time. Thus in this manner, the edge of the reflecting surface is drawn upon to determine the position, through which means a high measuring resolution is achieved. On the one hand, the extent of the reflecting surface is dimensioned to be large enough to illuminate a sufficient number of image-sensor elements on the image-sensor linear array, to achieve an adequate measuring accuracy; on the other hand, however, the surface dimensions of the reflecting surface are not so great, because otherwise the edges of the reflecting surface could disappear from the field of view of the line-scanning camera when the load swings. Since the position of the marking is not defined by determining brightness, but rather by determining the contrast, i.e., the sudden change in brightness at the edge formed by the reflecting surface and the non-reflecting surface, the danger of error measurements occurring due to other interfering light sources is minimal. Moreover, the light-exposure time can be regulated in accordance with the brightest area and not according to the average brightness in the field of view of the camera. This makes it possible for short exposure times, and thus short measuring times to be achieved.

The measuring accuracy and the measuring integrity are improved further when the reflecting surface has a predetermined extension in the direction of swing and when the evaluation unit searches for the signal from the image-sensor linear array after the occurrence of the two brightness changes having the greatest contrast at the time, and determines the position of the center of the marking from the middle between the two changes in brightness. Thus in this manner, the two outer edges of the reflecting surface are acquired in the direction of the extended image-sensor linear array, and the position of the marking is derived from the middle between the two edges.

One advantageous further development of the apparatus according to the invention provides for at least one laser-based scanning and ranging device to be mounted on the crane. This laser-based device produces a laser beam that is directed at an outer edge of the load running at right angles to the direction of swing, within an angular scanning range that is open longitudinally to the direction of swing. It also provides for additional positional data pertaining to the load to be determined from the returning laser light, and for the line-scanning camera and the laser-based scanning and ranging device to have a switching device to combine the positional data supplied by the line-scanning camera and the additional positional data supplied by the laser-based scanning and ranging device. This unites the advantages attained when positions are determined with the help of laser-based scanning and ranging devices with those attained when positions are determined using a line-scanning camera, while simultaneously eliminating the respective disadvantages of both measuring methods. Thus, the laser-based scanning and ranging devices allow the position of the load to be determined instantaneously, both in the horizontal as well as in the vertical direction, while in the final phase in which the load approaches its destination, the position of the destination can also be acquired. On the other hand, a high measuring accuracy forces a small angular scanning range, given still short-enough measuring times, so that the load can leave the angular scanning range in the case of larger pendulum oscillations. The achievable measuring times are still relatively long for an automatic pendulum-damping and positioning control. The line-scanning camera has the advantage of a larger acquisition angle and shorter measuring times. However, only horizontal changes in the position of the load are able to be detected by the line-scanning camera. The above-mentioned further development of the apparatus according to the present invention combines the mentioned advantages while simultaneously eliminating the disadvantages.

In the simplest case, the switching device has a changeover device, which makes it possible to switch over between the positional data pertaining to the laser-based scanning and ranging device and those of the line-scanning camera. A switch is made from the laser-based scanning and ranging device to the line-scanning camera when the load leaves the angular scanning range of the laser-based scanning and ranging device or when the measuring times of the laser-based scanning and ranging device are too slow, because the load is experiencing very fast pendulum motions.

Preferably, a reciprocal plausibility monitoring and/or correction of the positional data received from the laser-based scanning and ranging device and the line-scanning camera take place in the switching device.

Since substantially shorter measuring times are achieved with the line-scanning camera than are with the laser-based scanning and ranging device, it is advantageously provided for the positional data coming from the line-scanning camera to be inserted as intermediate values in the switching device between the additional positional data coming from the laser-based scanning and ranging device.

To supplement the laser-based scanning and ranging devices and the line-scanning camera, ultrasonic sensors can be arranged in the vicinity of the load to provide direct collision monitoring in the direction of swing.

DETAILED DESCRIPTION

Figures 1, 2:
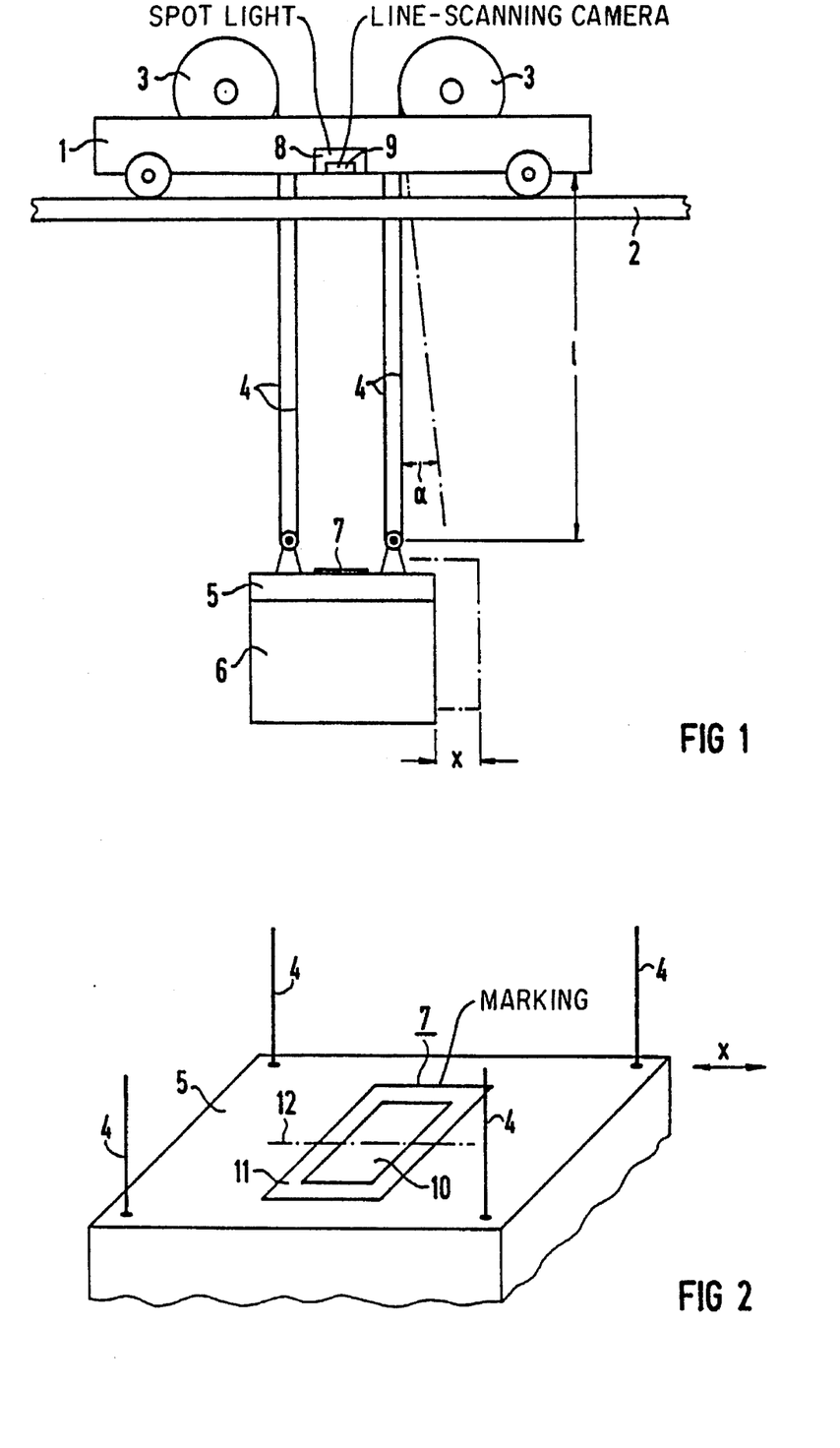
FIG. 1 depicts a container crane having the apparatus according to the present invention consisting of a marking, a spotlight and a line-scanning camera.
FIG. 2 depicts an example of a configuration of the marking in relation to the orientation of the line-scanning camera.

FIG. 1 schematically depicts a trolley 1, which is movable along a cantilever 2 (only shown in sections) of a container crane. Arranged on the trolley carriage 2 are hoisting-gear trains 3, on which a load-suspension frame (spreader) 5 for a load 6 to be transported, in this case a container, is suspended by a cable 4. The starting and braking of the trolley 1, but also external interference effects, such as wind power, can propel the load 6 into a pendulum motion, as clarified by the deflection of the load 6 (depicted with a dotted line) by a swing angle $\alpha$, or rather by a distance x.

A marking 7 is arranged on the load-suspension frame 5 to enable the pendulum motion of the load 6 to be measured. This marking 7 is illuminated by a spotlight 8 that is mounted on the trolley 1 vertically above the load 6 when the load is in its rest position. The light reflected by the marking 7 is acquired by a line-scanning camera 9 arranged directly next to or in the spotlight 8.

In a schematic, perspective representation, FIG. 2 depicts the load-suspension frame 5, together with the marking 7 configured on it, suspended from the cables 4. This marking 7 consists of a rectangular, reflecting surface 10 having one side edge aligned parallel to the direction of swing x. This reflecting surface 10 is surrounded by a non-reflecting surface 11. The reflecting surface 10 consists of a plurality of triple-reflector elements (not shown here), which reflect the light impinging upon them in the direction from which it came. This ensures that the light radiated by the spotlight 8 is reflected by the reflecting surface into the line-scanning camera 9, situated directly adjacent to the spotlight 8 and, in fact, independently of the specific amount of the pendulum deflection x. The line-scanning camera 9 is mounted on the trolley 1 so as to allow its scanning plane to intersect the marking 7 longitudinally to the direction of swing x, as shown by the dash-dotted line 12, which indicates the area of the marking 7 detected by the line-scanning camera 9.

Figures 3, 4:
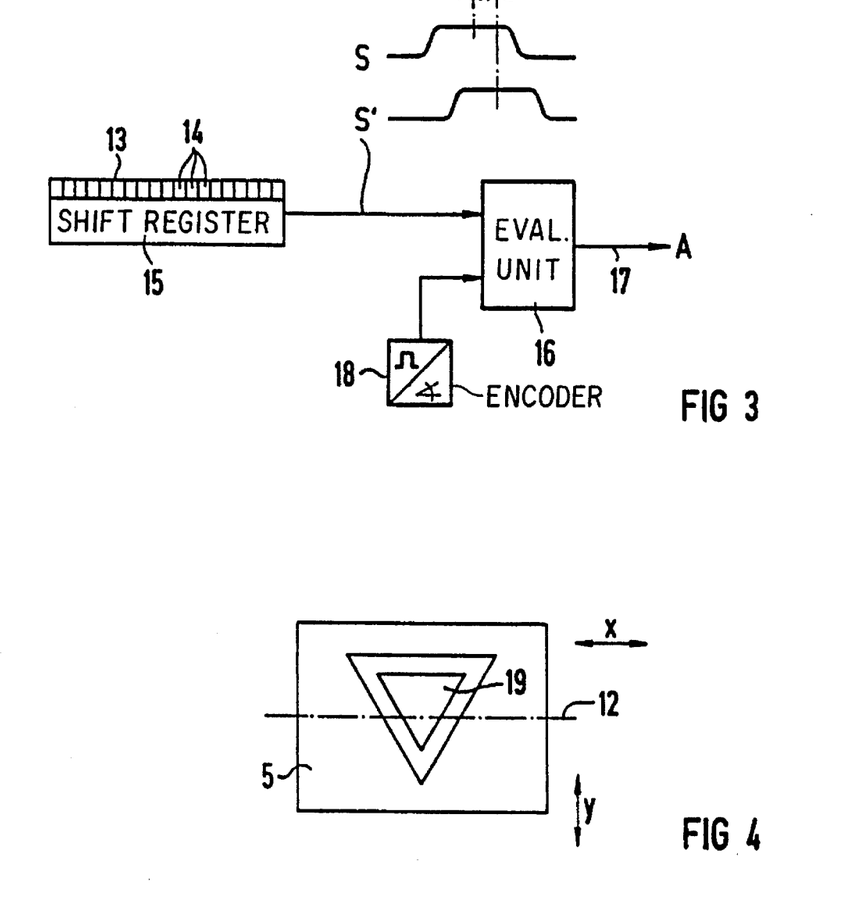
FIG. 3 shows a schematic block diagram of the line-scanning camera.
FIGS. 4 and 5 show different examples for shaping or configuring the marking in relation to the line-scanning camera.

As FIG. 3 shows, the line-scanning camera 9 has an image-sensor linear array 13 with a plurality of side-by-side image-sensor elements 14, whose image information is transferred in parallel into a shift register 15 and, from there, is routed serially to an evaluation unit 16. To determine the position of the marking 7, the evaluation unit 16 searches for the serial signal S from the image-sensor linear array 13 after the occurrence of the two brightness changes having the greatest contrast at the time and, in this manner, detects the edges of the reflecting surface 10 running at right angles to the scanning direction 12. The position of the center of the marking 7 is determined in the evaluation unit from the middle between the two detected changes in brightness and made available as an output signal A via the output 17 of the evaluation unit 16 for a further processing, for example, within the scope of a load-positioning control or a compensation of the pendulum oscillations. When there is a pendulum movement by the distance x, a corresponding shift in the signal pattern S' of the image-sensor linear array 13 results, from which the distance x is detected in the evaluation unit 16. To acquire the swing angle $\alpha$, the lifting height and, thus, the pendulum length l are measured with the aid of a shaft-angle encoder 18 or an absolute-value device on one of the cable winches 3 and supplied to the evaluation unit 16, in which the swing angle is determined for $\alpha = \arcsin x/l$. To ensure that the marking 7 does not disappear from the field of view of the line-scanning camera 9 in the case of undesirable pendulum motions at right angles to the pendulum motion x to be acquired, the marking 7 has a specified minimum width at right angles to the orientation 12 of the image-sensor linear array 13.

As FIG. 4 shows, pendulum motions can also be acquired at right angles to the orientation 12 of the image-sensor linear array 13, in that the reflecting surface 19 has a width that varies at right angles to the orientation 12 of the image-sensor linear array 13. The component x of the pendulum motion in the direction of the image-sensor linear array 13 is determined from the position of the image formation of the reflecting surface 19 on the image-sensor linear array, and the motion component y running at right angles to it as a function of the edge clearance of the reflecting surface 19 acquired by the image-sensor linear array 13.

Figure 5:
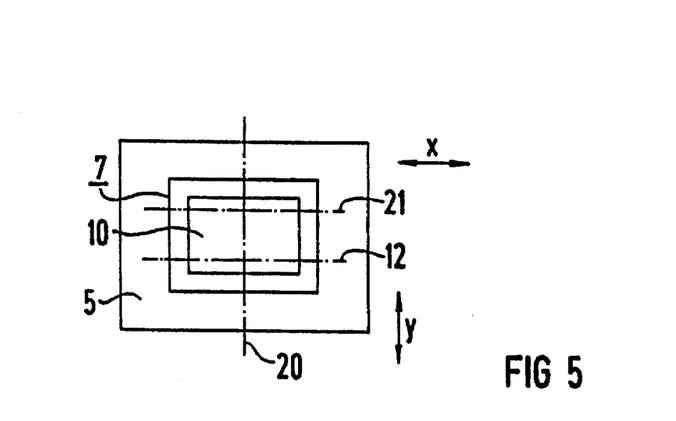

Alternatively to this, as indicated in FIG. 5 by another dot-dash line 20, another image-sensor linear array can be provided at right angles to the first image-sensor linear array 13 and acquire pendulum motions in the y-direction, in the same way as the first linear array. Rotary motions of the marking 7 are acquired by arranging an additional image-sensor linear array parallel to and with clearance from the image-sensor linear array 13. This additional image-sensor linear array optically detects the area denoted by 21 of the marking 7. In each case, the middle between the edges of the reflecting surface 10 intersected by the two scanning directions 12 and 21 is determined both in the scanning direction 12, as well as in the scanning direction 21, as described on the basis of FIG. 2. Thus, a rotary motion of the load can be detected from the difference between the output signals from the evaluation devices arranged downstream from the two parallel image-sensor linear arrays.

Figure 6:
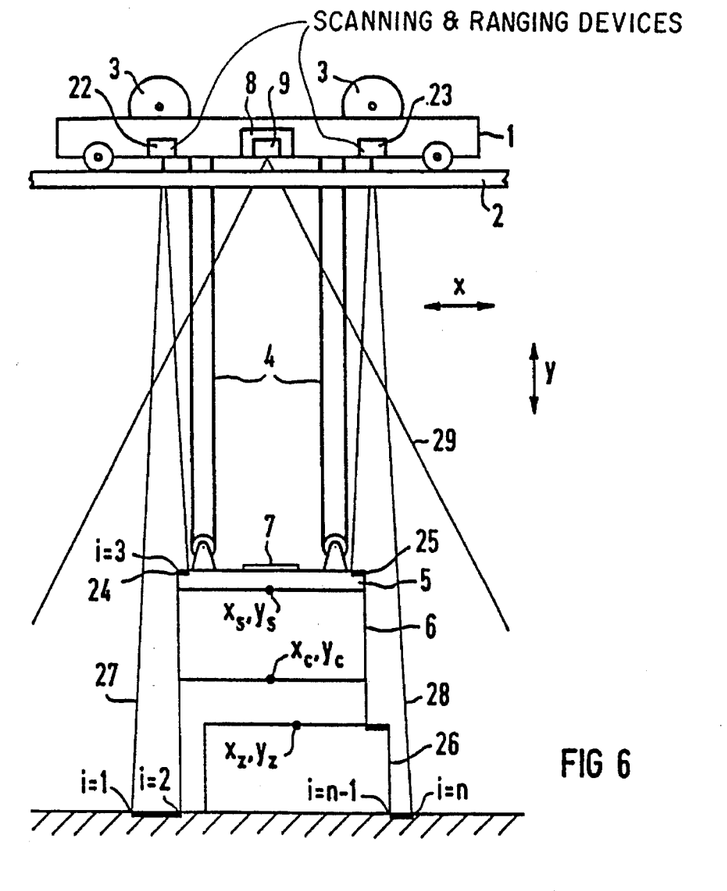
FIG. 6 depicts a container crane as in FIG. 1, which is additionally equipped with laser-based scanning and ranging devices.
Figure 7:
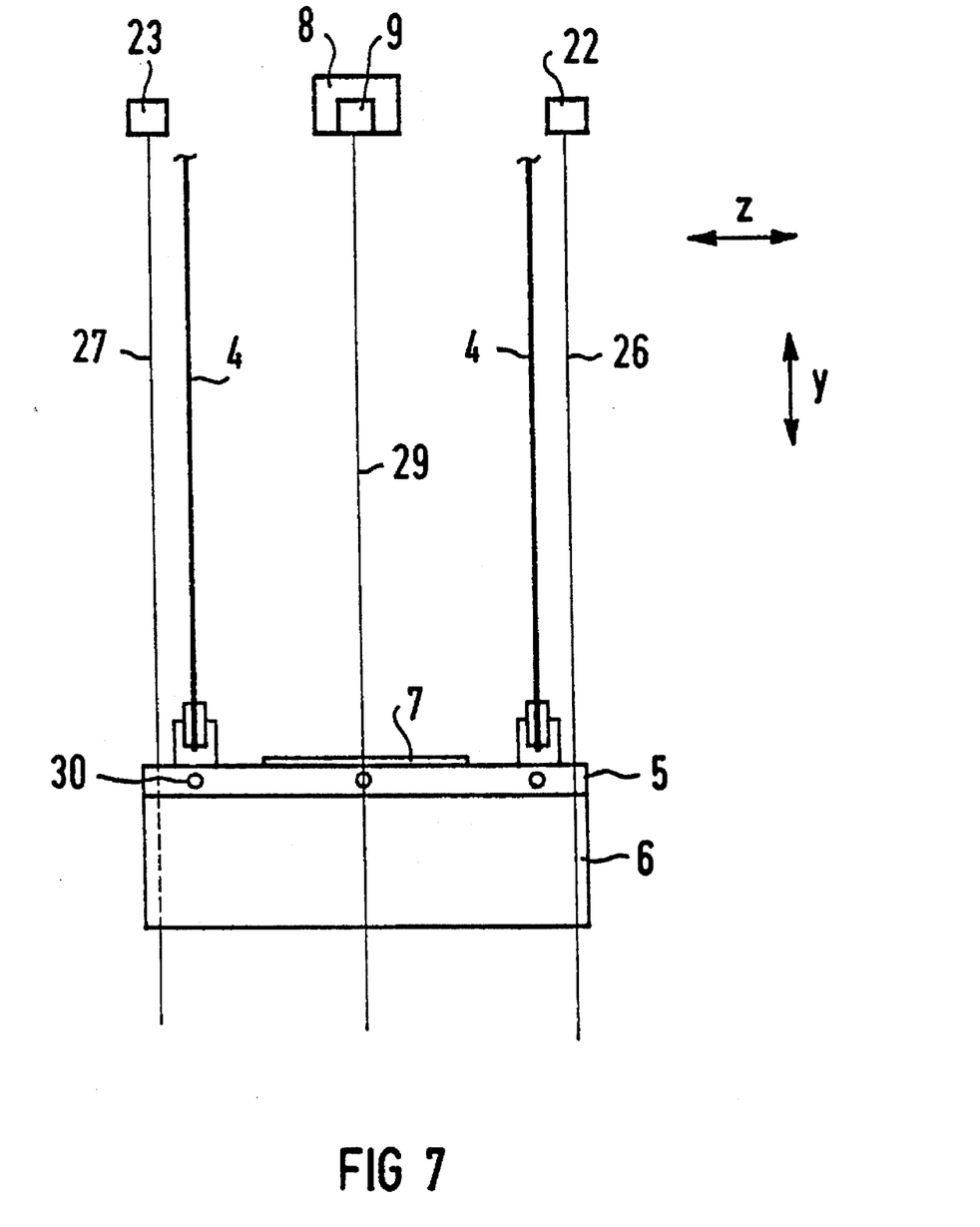
FIG. 7 depicts the crane according to FIG. 6 in a side view rotated by 90°.

FIG. 6 depicts a container crane, which is distinguished from the crane shown in FIG. 1 in that two additional laser-based scanning and ranging devices 22 and 23 are arranged on the trolley 1 above the two outer edges 24 and 25 of the load-suspension frame 5 or rather of the load 6 running at right angles to the moving direction x of the trolley 1. The two laser-based scanning and ranging devices 22 and 23 make it possible in each case for the instantaneous load position to be measured in relation to the surroundings of the load 6, thus enabling the load 6 to be set down with positional accuracy on an additional container (target container) 26 that has already been put down. Each of the two laser-based scanning and ranging devices 22 and 23 generates a laser beam 27 and 28, respectively, which is deflected within an angular scanning-measuring range. This angular scanning-measuring range is open longitudinally to the direction of swing x and vertically intersects the outer edge 24 or 25 diametrically opposing the laser-based scanning and ranging devices 22 or 23 in question. In FIG. 6, those locations on the load-suspension frame 5, or rather on the load 6 and its surroundings, where the laser beams 27 and 28 strike, are emphasized by a darker line. By evaluating the propagation time of the laser light and the instantaneous angle of radiation of the laser beam 27 or 28, the positional coordinates in the horizontal x-direction and in the vertical y-direction can be defined for each location where the laser beam 27 or 28 strikes. As FIG. 6 shows, when the load 6 approaches the target container 26, the laser beams 27 and 28 also cover areas of the target container 26, as long as the load 6 is not positioned exactly above this target container. As soon as both laser beams 27 and 28 no longer impinge upon the target container 26, the container 6 is positioned directly over the target container 26 and can be lowered on to this container.

Figure 8:
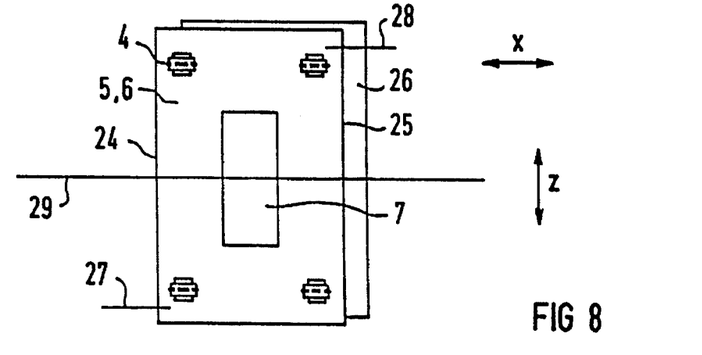
FIG. 8 depicts a plan view of the load suspended from the crane in accordance with FIG. 6.

The optimal position of the two laser-based scanning and ranging devices 22 and 23 in the x-direction is not directly over the particular outer edges 24 or 25 of the load-suspension frame 5 or of the load 6, but rather somewhat outside of this, so that no inaccessible, dead angle is formed for the laser beams 27 and 28 below the outer edges 24 and 25. As the top view of the load-suspension frame 5 with the load 6 according to FIG. 8 shows, the two laser-based scanning and ranging devices 22 and 23 are arranged with their angular scanning ranges 27 and 28 at right angles to the x-direction, thus offset in the z-direction. In this manner, besides measuring pendulum motions in the x-direction, it is also possible to measure rotary pendulum oscillations of the load 6, which are manifested in that the x-coordinates of the outer edges 24 and 25 measured with the laser beams 27 and 28 vary as a function of time. In the z-direction, the load-suspension frame 5 is able to be adjusted hydraulically in its longitudinal direction and can thus be adapted to the current container length. Since the container 6 can be open to the top or be covered by an irregular tarpaulin, the outer edges 24 and 25 are able to be scanned by means of the laser beams 27 and 28 most reliably where the outer walls of the container 6 run between the outer edges 24 and 25, parallel to the x-direction. The two laser-based scanning and ranging devices 22 and 23 are mounted on the trolley so as to be movable in the z-direction, to enable the outer edges 24 and 25 to be scanned given different container lengths at these locations.

According to the current state of the art, it is not yet possible to simultaneously achieve very high measuring accuracies and short measuring times over a larger scanning angular range using the two laser-based scanning and ranging devices 22 and 23. Therefore, to achieve a high measuring accuracy with still tolerable measuring times, it is necessary to limit the angular scanning range to a few degrees. The danger exists thereby that the load 6 disappears from the field of view of the laser-based scanning and ranging devices 22 and 23 given greater pendulum motions. Moreover, even the measuring times that are achievable given a small angular scanning range are relatively long for drawing upon the obtained measured values to automatically regulate the load pendulum damping or the load positioning.

Therefore, the marking 7, which is illuminated by the spotlight 8 retained on the trolley 1 when the load 6 is in a neutral position, is applied to the load-suspension frame 5, the light reflected by the marking 7 being detected by the line-scanning camera 9 arranged directly next to or in the spotlight 8. The line-scanning camera 9 is arranged on the trolley 1 so as to allow its scanning plane 29 to intersect the marking 7 longitudinally to the direction of swing x. The line-scanning camera can detect the position of the load 6 in the x-direction, even when the load 6 experiences greater pendulum motions, as was already described on the basis of FIGS. 1–3.

In addition, ultrasonic sensors 30 are mounted in the vicinity of the two outer edges 24 and 25 of the load-suspension frame 5 to monitor collisions in the x-direction.

In configuring the laser-based scanning and ranging devices 22, 23 and the line-scanning camera 9, one started out from the assumption that pendulum oscillations of the load take place predominantly in the travel direction x of the trolley 1. If one would also like to acquire all possible pendulum oscillations at right angles to this, then this can be accomplished by configuring two additional laser-based scanning and ranging devices and one line-scanning camera in the z-direction.

Figure 9:
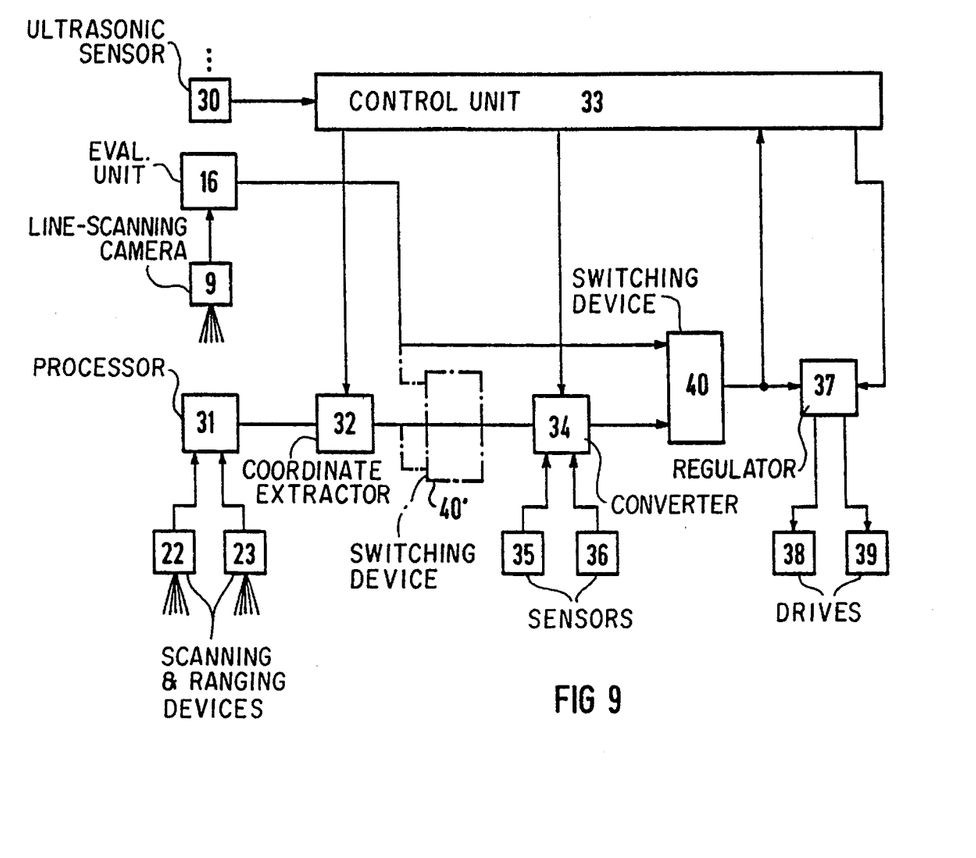
FIG. 9 depicts the block diagram of a controlling structure for the crane in accordance with FIG. 6.

FIG. 9 depicts the block diagram of a control structure for the container crane according to FIG. 6. The two laser-based scanning and ranging devices 22 and 23 are linked to a shared device 31 for data preprocessing, which determines the coordinates $x_i$ and $y_i$ of all acquired edges i=1 . . . n of the areas emphasized in FIG. 6 by darker lines from the scanning values obtained from the load 6 and its surroundings within the angular scanning ranges 27 and 28. These edge coordinates determined in the coordinate system of the trolley 1 are supplied to a unit 32 for extracting coordinates, in which the position coordinates $x_s$, $y_s$ of the load-suspension frame 5, the load coordinates $x_c$, $y_c$ of the load 6 and/or the coordinates $x_z$, $y_z$ of the target container 26, on which the load 6 is supposed to be set down, are calculated from the edge coordinates and outer dimensions of the containers 6 and 26 communicated by a higher-level control unit 33. In addition to these positional coordinates, the torque angle of the load-suspension frame 5, of the load 6, and of the target container 26 are calculated in comparison with the trolley 1. Finally, the unit 32 supplies the coordinates of possible collision objects, which can lie in front or behind the target container 26, when viewed from the travel direction x.

In another unit 34, the positional coordinates determined in relation to the trolley 1 can be converted into crane-specific or land-specific coordinates, to which end the current position of the trolley 1 and of the container crane are communicated to the unit 34 by a device 35 for measuring the trolley-carriage position and by a device 36 for measuring the crane position. The thus converted coordinate values are supplied to the higher-level control unit 33 as actual positional values for controlling the crane.

Moreover, the positional coordinates calculated in the unit 34 are supplied to a device 37 for regulating pendulum damping and positioning. This device executes a time-optimal control of the drive 38 for the trolley 1 and of the drive 39 for the hoisting-gear trains 3, while damping the pendulum oscillations being experienced by the load 6, in dependence upon the coordinate values and upon driving data communicated by the control unit 33, such as the current velocity and acceleration values of the trolley 1 and of the hoisting-gear trains 3.

The position of the load-suspension frame 5 or rather of the load 6 acquired by the line-scanning camera 9 and converted in the signal-evaluation unit 16 into an x-coordinate is supplied to the higher-level control device 26 and to the device 37 as a supplemental or alternative value to the corresponding positional value determined by means of the laser-based scanning and ranging devices 22 and 23. To this end, the load-position values coming from the laser-based scanning and ranging devices 22 and 23 and from the line-scanning camera 9 are linked together in the x-direction in a switching device 40, before they are fed to the control unit 33 and to the device 37. The logic operation consists in the simplest case of switching over between the two values, the switch being made then in each case from the laser-based scanning and ranging devices 22 and 23 to the line-scanning camera 9, when the load-suspension frame 5 or rather the load 6 projects out of the angular scanning ranges 27 and 28. Moreover, the positional values supplied by the laser-based scanning and ranging devices 22 and 23 and the line-scanning camera 9 can be used redundantly, a reciprocal plausibility control and/or correction of the values following thereby with the help of the redundantly obtained values. The positional values obtained by the line-scanning camera 9 with a considerably higher measuring rate serve to complete the positional values coming from the laser-based scanning and ranging devices 22 and 23 with a lower measuring rate, so that exact measured values are available with the required high measuring rate for regulating pendulum damping and positioning in the unit 37, particularly in the case of rapidly changing load positions, such as extreme pendulum motions.

As indicated by a dotted line in FIG. 9, the switching device 40' can also be arranged in the signal path upstream from the unit 34.

The ultrasonic sensors 30 are directly linked to the control unit 33 to provide direct collision monitoring.

What is claimed is:

1. An apparatus for acquiring pendulum oscillations in a crane bearing a load, comprising:

a) a first reflective marking being disposed in an area of the load;

b) a light being directed at said first reflective marking and being mounted on the crane;

c) a line-scanning camera being mounted on the crane, being directed at said first reflective marking, and having a first image-sensing linear array which is aligned longitudinally to a direction of swing (x), wherein said first image-sensing linear array outputs a signal indicative of light reflected by said first reflective marking; and d) a first evaluation unit being coupled downstream from the line-scanning camera, and determining positional data pertaining to the load from said signal output by the first image-sensing linear array.

2. The apparatus according to claim 1, wherein said first reflective marking further comprises a reflecting surface extending by a predetermined minimum amount at right angles to an orientation of the first image-sensing linear array.

3. The apparatus according to claim 1, wherein the first reflective marking further comprises a reflecting surface whose width varies at right angles to an orientation of the first image-sensing linear array.

4. The apparatus according to claim 1, further comprising a second image-sensing linear array, and a second evaluation unit being coupled downstream from the second image-sensing linear array, wherein said second image-sensing linear array is oriented at right angles to an orientation of the first image-sensing linear array.

5. The apparatus according to claim 1, wherein the light and the line-scanning camera are disposed directly side by side, and the first reflective marking further comprises a reflecting surface including a plurality of triple-reflector elements.

6. The apparatus according to claim 1, wherein the light and the line-scanning camera are disposed in an immediate vicinity of a pendulum suspension mount of the crane, and the first reflective marking is disposed vertically below the light and the line scanning camera on the load when the load is in its rest position.

7. The apparatus according to claim 1, further comprising a measuring device determining a prevailing pendulum length, and outputting a measuring signal, wherein the measuring signal is evaluated in the first evaluation unit together with the signal output from the first image-sensing linear array to define a swing angle of the load.

8. The apparatus according to claim 1, further comprising a measuring device determining a prevailing pendulum length, and outputting a measuring signal, wherein the measuring signal is evaluated in the first evaluation unit together with the signal output from the first image-sensing linear array to define a swing angle of the load and an instantaneous load position.

9. The apparatus according to claim 1, further comprising a measuring device determining a prevailing pendulum length, and outputting a measuring signal, wherein the measuring signal is evaluated in the first evaluation unit together with the signal output from the first image-sensing linear array to define an instantaneous load position.

10. The apparatus according to claim 1, wherein the first reflective marking further comprises a reflecting surface and a border surrounding the reflecting surface in the direction of swing (x), wherein the border comprises a non-reflecting surface, whereby to determine a position of the first reflective marking the first evaluation unit searches for the signal output from the first image-sensing linear array after there has been a change in level of the signal indicating a change in brightness of the reflected light having the greatest contrast.

11. The apparatus according to claim 10, wherein the reflecting surface further comprises a predetermined extension in the direction of swing (x), the first evaluation unit searches for the signal output from the first image-sensor linear array after an occurrence of two brightness changes having the greatest contrast at the time, and the first evaluation unit determines a center position of the first reflective marking from a middle between the two brightness changes.

12. The apparatus according to claim 1, further comprising an ultrasonic sensor being disposed in a vicinity of the load and providing direct collision monitoring in the direction of swing (x).

13. An apparatus for acquiring pendulum oscillations in a crane bearing a load, comprising:

a) a first reflective marking being disposed in an area of the load;

b) a light being directed at said first reflective marking and being mounted on the crane;

c) a line-scanning camera being mounted on the crane, being directed at said first reflective marking, and having a first image-sensing linear array which is aligned longitudinally to a direction of swing (x), wherein said first image-sensing linear array outputs a signal indicative of light reflected by said first reflective marking; and d) a first evaluation unit being coupled downstream from the line-scanning camera, and determining positional data pertaining to the load from said signal output by the first image-sensing linear array e) a second image-sensing linear array outputting a second signal indicative of light reflected by said first reflective marking; and f) a second evaluation unit being coupled downstream from the second image-sensing linear array, and determining positional data pertaining to the load from said signal output by the second image-sensing linear array, wherein said second image-sensing linear array is oriented in parallel to an orientation of the first image-sensing linear array, and the first reflective marking is extended at right angles to the orientation of the first image-sensing linear array, whereby the first reflective marking is optically detected by the second image-sensing linear array so that a rotary motion of the load around a pendulum axis of the crane can be determined from a difference in positional data supplied by the first and second evaluation units.

14. An apparatus for acquiring pendulum oscillations in a crane bearing a load, comprising:

a) a first reflective marking being disposed in an area of the load:

b) a light being directed at said first reflective marking and being mounted on the crane;

c) a line-scanning camera being mounted on the crane, being directed at said first reflective marking, and having a first image-sensing linear array which is aligned longitudinally to a direction of swing (x), wherein said first image-sensing linear array outputs a signal indicative of light reflected by said first reflective marking; and d) a first evaluation unit being coupled downstream from the line-scanning camera, and determining positional data pertaining to the load from said signal output by the first image-sensing linear array e) a second reflective marking being disposed in an area of the load at a predetermined distance from the first reflective marking in a right angle from an orientation of the first image-sensing linear array;

f) a second image-sensing linear array outputting a second signal indicative of light reflected by said second reflective marking; and g) a second evaluation unit being coupled downstream from the second image-sensing linear array, and determining positional data pertaining to the load from said signal output by the second image-sensing linear array, wherein said second image-sensing linear array is oriented in parallel to an orientation of the first image-sensing linear array, whereby the second reflective marking is optically detected by the second image-sensing linear array so that a rotary motion of the load around a pendulum axis of the crane can be determined from a difference in positional data supplied by the first and second evaluation units.

15. An apparatus for acquiring pendulum oscillations in a crane bearing a load, comprising:

a) a first reflective marking being disposed in an area of the load;

b) a light being directed at said first reflective marking and being mounted on the crane;

c) a line-scanning camera being mounted on the crane, being directed at said first reflective marking, and having a first image-sensing linear array which is aligned longitudinally to a direction of swing (x), wherein said first image-sensing linear array outputs a signal indicative of light reflected by said first reflective marking; and d) a first evaluation unit being coupled downstream from the line-scanning camera, and determining positional data pertaining to the load from said signal output by the first image-sensing linear array e) a switching device being coupled to the line scanning camera; and f) at least one laser-based scanning and ranging device being mounted on the crane, being coupled to the switching device, and producing a laser beam that is directed at an outer edge of the load running at right angles to the direction of swing (x) within an angular scanning range that is open longitudinally to the direction of swing (x), wherein additional positional data pertaining to the load is determined from returning laser light, and the switching device switches between the line-scanning camera and the laser-based scanning and ranging device to combine the positional data supplied by the line-scanning camera and the additional positional data supplied by the laser-based scanning and ranging device.

16. The apparatus according to claim 15, wherein the switching device further comprises a changeover device to switch over between the additional positional data pertaining to the laser-based scanning and ranging device and the positional data from the line-scanning camera.

17. The apparatus according to claim 15, wherein the switching device performs reciprocal plausibility monitoring and correction of the additional positional data received from the laser-based scanning and ranging device and the positional data from the line-scanning camera.

18. The apparatus according to claim 16, wherein the switching device performs reciprocal plausibility monitoring and correction of the additional positional data received from the laser-based scanning and ranging device and the positional data from the line-scanning camera.

19. The apparatus according to claim 15, wherein the switching device inserts positional data coming from the line-scanning camera as intermediate values between the additional positional data coming from the laser-based scanning and ranging device.

20. The apparatus according to claim 17, wherein the switching device inserts positional data coming from the line-scanning camera as intermediate values between the additional positional data coming from the laser-based scanning and ranging device.

21. A method for acquiring pendulum oscillations in a crane bearing a load, comprising the steps of:

a) directing a light at a first reflective marking disposed in an area of the load;

b) directing a line-scanning camera at said first reflective marking to receive reflected light from the first reflective marking;

c) aligning a first image-sensing linear array in the line scanning camera longitudinally to a direction of swing (x) of the crane;

d) outputting a signal from the first image-sensing linear array, wherein the signal is indicative of light reflected by said first reflective marking; and d) determining positional data pertaining to the load from said signal output by the first image-sensing linear array.

* * * * *